US008218429B2

(12) United States Patent
Wang et al.

(10) Patent No.: US 8,218,429 B2
(45) Date of Patent: Jul. 10, 2012

(54) METHOD AND DEVICE FOR MULTICAST TRAFFIC REDUNDANCY PROTECTION

(75) Inventors: Liyang Wang, Shenzhen (CN); Jun Liu, Shenzhen (CN); Fenghua Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 12/496,837

(22) Filed: Jul. 2, 2009

(65) Prior Publication Data

US 2009/0268607 A1 Oct. 29, 2009

Related U.S. Application Data

(63) Continuation of application No. PCT/CN2008/070572, filed on Mar. 25, 2008.

(30) Foreign Application Priority Data

Mar. 31, 2007 (CN) .......................... 2007 1 0073938

(51) Int. Cl.
*H04L 12/26* (2006.01)
*H04L 12/28* (2006.01)
(52) U.S. Cl. ......... 370/218; 370/242; 370/390; 370/312
(58) Field of Classification Search .......... 370/216–217, 370/218, 242, 390, 312, 432, 219–220, 241
See application file for complete search history.

(56) References Cited

U.S. PATENT DOCUMENTS

| 7,152,179 | B1 * | 12/2006 | Critchfield | 714/4.11 |
|---|---|---|---|---|
| 7,486,610 | B1 * | 2/2009 | Bhupalam et al. | 370/216 |
| 7,710,864 | B2 * | 5/2010 | Binetti et al. | 370/218 |
| 7,929,420 | B2 * | 4/2011 | Jesuraj | 370/218 |
| 2003/0185209 | A1 | 10/2003 | Lee | |
| 2003/0193958 | A1 * | 10/2003 | Narayanan | 370/400 |
| 2007/0008880 | A1 * | 1/2007 | Buchko et al. | 370/218 |
| 2007/0165632 | A1 * | 7/2007 | Zwiebel | 370/390 |
| 2007/0177525 | A1 * | 8/2007 | Wijnands et al. | 370/254 |
| 2007/0239879 | A1 * | 10/2007 | Serbest et al. | 709/230 |
| 2008/0049763 | A1 * | 2/2008 | Damm et al. | 370/400 |
| 2008/0095161 | A1 * | 4/2008 | Xu | 370/390 |

(Continued)

FOREIGN PATENT DOCUMENTS

CN 1848807 A 10/2006

(Continued)

OTHER PUBLICATIONS

International Search Report from P.R. China in International Application No. PCT/CN2008/070572 mailed Jul. 10, 2008.

(Continued)

*Primary Examiner* — Steven H Nguyen
*Assistant Examiner* — Candal Elpenord
(74) *Attorney, Agent, or Firm* — Finnegan, Henderson, Farabow, Garrett & Dunner LLP

(57) ABSTRACT

A method of multicast traffic redundancy protection includes detecting an original active router; switching a Virtual Route Redundancy Protocol (VRRP) state, by a Virtual Route Redundancy Protocol (VRRP) state switching module if the original active router is faulty; selecting a new active router, notifying, by the VRRP state switching module, a Protocol Independent Multicast (PIM) routing protocol module of the new active router after the VRRP state switching; and, selecting, by the PIM module, the new active router in the VRRP as a Designated Router (DR) in the PIM.

8 Claims, 4 Drawing Sheets

U.S. PATENT DOCUMENTS

2008/0198766 A1* 8/2008 Ogawa .......................... 370/254

FOREIGN PATENT DOCUMENTS

| CN | 1855885 A | 11/2006 |
| CN | 101035009 A | 9/2007 |
| JP | 2003-143193 A | 5/2003 |
| JP | 2003143193 | 5/2003 |

OTHER PUBLICATIONS

Chinese Office Action dated May 30, 2008, issued in related Chinese Application No. 200710073938.6, with English Translation (9 pages).

Communication enclosing a Supplemental European Search Report for EP Application No. 08715308.6, mailed Mar. 10, 2010 (11 pages).

Written Opinion of the International Searching Authority (translation) dated (mailed) Jul. 10, 2008, issued in related Application No. PCT/CN2008/070572, filed Mar. 25, 2008, Huawei Technologies Co., Ltd.

Product & Technology, Virtual Router Redundancy Protocol and Applications, Communications World, Jul. 8, 2002, p. 42 (2 pages).

Fenner et al., Protocol Independent Multicast—Sparse Mode (PIM-SM): Protocol Specification (Revised), Network Working Group, Request for Comments: 4601, Obsoletes: 2362, Category: Standards Track, Aug. 2006, (58 pages).

Hinden et al., Virtual Router Redundancy Protocol (VRRP): Network Working Group, Request for Comments: 3768, Obsoletes: 2338, Category: Standards Track, Apr. 2004, (27 pages).

European Patent Office Communication pursuant to Article 94(3) EPC, European search opinion for Application No. 08 715 308.6-1249, mailed Aug. 9, 2011 Huawei Technologies C., LTD 7 pgs.

D. Katz et al, Bidirectional Forwarding Detection draft-ietf-bfd-base-04 txt, Juniper Networks, Network Working Group, Internet Draft, Cisco Systems, Oct. 2005, pp. 1-44.

D. Katz et al., Bidirectional Forwarding Detection, draft-ietf-bfd-base-06.txt, Network Working Group, Internet Draft, Juniper Networks, Expires: Sep. 2007, pp. 1-48.

* cited by examiner

METHOD AND DEVICE FOR MULTICAST TRAFFIC REDUNDANCY PROTECTION

CROSS REFERENCE

This application is a continuation of International Application No. PCT/CN2008/070572, filed on Mar. 25, 2008. The application claims the priorities of CN application No. 200710073938.6, filed on Mar. 31, 2007 with the State Intellectual Property Office of the People's Republic of China, entitled "METHOD AND DEVICE FOR MULTICAST TRAFFIC REDUNDANCY PROTECTION", the entire contents of which are incorporated herein by reference.

TECHNICAL FIELD

The present disclosure relates to network communication technologies, and in particular, to a method and a device for multicast traffic redundancy protection.

BACKGROUND

The multicast technology is applied and developed initially on the network layer. With development of the Internet, more and more data, voice, and video information is exchanged in the network, and new services such as Internet Protocol Television (IPTV), e-commerce, online conference, online auction, Video On Demand (VOD), and tele-education are emerging. Such services require information security and network bandwidth, and are not free of charge. As regards such single-point-to-multipoint issues, the multicast technology provides an effective solution, implements efficient transfer of data from a single point to multiple points in the IP network, saves the network bandwidth massively, and reduces the network load. New Value-Added Services (VASs) can be provided conveniently by using the multicast features of the network.

IP multicast protocols mostly include the Internet Group Management Protocol (IGMP) applied to host registration and the multicast routing protocol applied to multicast routing and forwarding.

The IGMP is generally applied between a receiving host and a multicast router. It defines how to establish and maintain the multicast membership between the host and the router.

The multicast routing protocol runs between the multicast routers to establish and maintain multicast routes, and forwards the multicast packets correctly and efficiently. The multicast route establishes a loopless data transmission path from the data source to multiple receivers, namely, constructs a distribution tree structure. Like unicast routing protocols, the multicast routing protocols come in two categories: intra-domain multicast routing protocols, which transfer the information to the receiver by discovering the multicast source and constructing the multicast distribution tree, for example, Distance Vector Multicast Routing Protocol (DVMRP), Multicast Open Shortest Path First (MOSPF), Protocol Independent Multicast-Dense Mode (PIM-DM), and Protocol Independent Multicast-Sparse Mode (PIM-SM); and inter-domain multicast routing protocols, which discover the multicast sources in other multicast domains, for example, Multicast Source Discovery Protocol (MSDP), and transfer multicast routing information between the autonomous systems, for example, Multicast Border Gateway Protocol (MBGP).

In Protocol Independent Multicast (PIM), the unicast routing protocol that provides routes for the IP multicast may be a static routing protocol, Routing Information Protocol (RIP), Open the Shortest Path First (OSPF), Intermediate System to Intermediate System (IS-IS), or Border Gateway Protocol (BGP), and so on; the multicast route is independent of the unicast routing protocol, and is appropriate only if the unicast routing protocol can generate routing table entries. Reverse Path Forwarding (RPF) is a multicast forwarding mode. The RPF checks the source IP and interfaces of the received packets first, and compares them with the IP and interfaces in unicast routing table. If the packet can be returned along the unicast route from the receiving interface to the source site, the RPF check succeeds, and the multicast packet is regarded as coming from the correct path; otherwise, the multicast packet is discarded as a redundant packet. By virtue of the RPF forwarding, the PIM transfers the multicast information in the network. For ease of description, the network composed of the PIM-supported multicast routers is called a "PIM multicast domain".

As shown in FIG. 1, the same packet is sent repeatedly in the shared network, such as Ethernet. For example, multicast routers A, B, and C in the LAN network segment shown in FIG. 1, and each of the routers has a receiving path to the multicast source S. After receiving a multicast data packet, which is sent by multicast source S, from the upstream, the routers A, B, and C forward the multicast packet to the Ethernet, and the Host A, which is a downstream node, receives three identical multicast packets.

In order to avoid such a circumstance, a unique forwarder, namely, Designated Router (DR) should be selected through Assert messages. Each router in the network selects the best path by sending an Assert message, and the selected router becomes an upstream neighbor of the (S, G) and is responsible for forwarding the (S, G) multicast packet. Regarding the remaining routers that are not selected, their corresponding interfaces are cut so that the information forwarding at the interfaces is forbidden. The comparative items may be the metric value, namely, the cost value of routing from routers to the multicast source. If the metric value is the same, the IP address on the interface is compared, namely, greater IP addresses are of higher priority.

The period of the Assert message of the PIM is 60 seconds by default. If the upstream neighboring router fails, the routers re-converge through the Assert messages of the PIM, which takes at least 180 seconds (three periods), during which the multicast traffic is interrupted.

With the fault detection such as Bidirectional Forwarding Detection (BFD) protocol in the prior art, the fault of the PIM router on the shared network segment may be discovered as early as possible. Routers are triggered to reselect a new upstream router in the shared network segment through Assert messages of the PIM.

However, after the fault is discovered through the BFD packets, routers are triggered to re-converge and select a new DR through the Assert messages of the PIM. The switching delay still exists, and the multicast traffic is still interrupted transiently.

BRIEF SUMMARY

A method and a device for multicast traffic redundancy protection are provided in various embodiments which may shorten the switching delay caused by re-convergence of the Assert after occurrence of a fault and avoid the transient interruption of the multicast traffic.

A method of multicast traffic redundancy protection is provided. The method includes detecting an original active router; switching a state, by a Virtual Route Redundancy Protocol (VRRP) state switching module if the original active router is faulty, and selecting a new active router, notifying a Protocol Independent Multicast routing protocol (PIM) module of the new active router after the state switching, and selecting, by the PIM module, the new active router as a Designated Router (DR).

A layer-3 network device is also provided herein. The device includes a fault detecting module, adapted to detect whether an original active router is faulty, a VRRP state switching module, adapted to switch the state of the VRRP, and notify a PIM module of a new active router in the VRRP, and the PIM module, adapted to select the new active router as a DR; when detecting a fault of the original active router, the fault detecting module notifies the VRRP state switching module, and the VRRP state switching module switches a state and selects the new active router.

Consistent with some embodiments, the convergence time of the VRRP is three seconds, namely, the switching time is less than three seconds. In some embodiments, the VRRP in which the state of the router switches fast triggers the PIM to switch quickly, and use the new active router as a DR, thus reducing the convergence time of the Assert reselection. The multicast traffic may be switched to the new DR quickly, thus shortening the switching delay of the Assert effectively, avoiding transient interruption of the multicast traffic, and ensuring reliability of the multicast data.

Furthermore, according to some embodiments, the active router in the VRRP in a unicast environment is the same as the DR in the PIM in a multicast environment. Therefore, the PIM multicast path is ensured to be the same as the unicast path at the subscriber side.

Furthermore, most network devices in the actual networking environment support the VRRP. Therefore, according to some embodiments, the multicast traffic may be switched to the new DR quickly without changing the existing network devices, thus shortening the switching delay of the Assert effectively and avoiding transient interruption of the multicast traffic.

DETAILED DESCRIPTION OF THE DISCLOSED EMBODIMENTS

The present disclosure is described in detail hereunder with reference to the accompanying drawings and specific embodiments.

Figure 1:
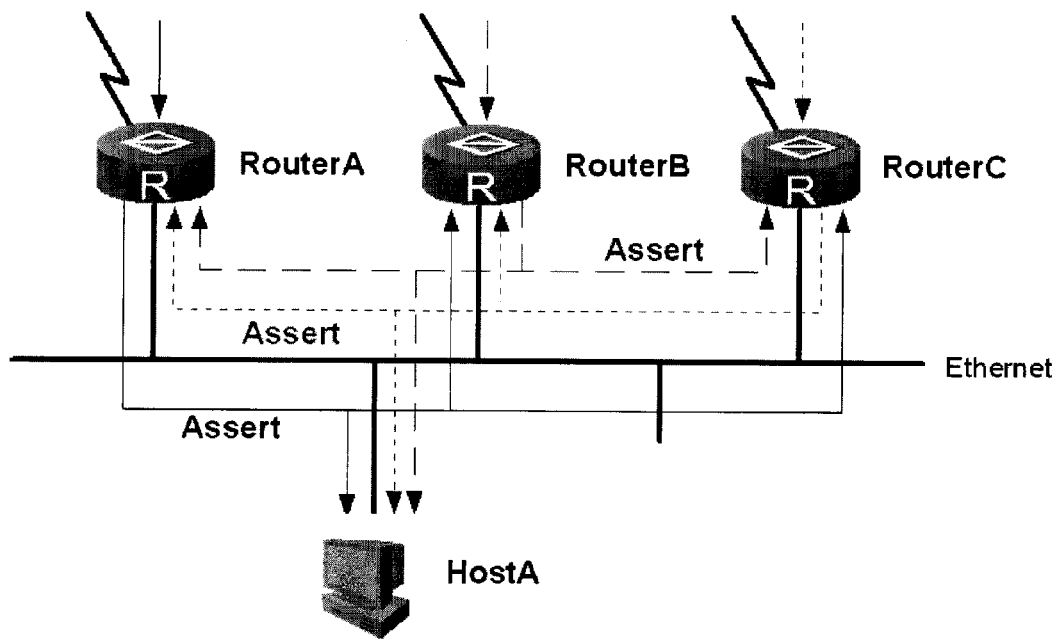
FIG. 1 shows a networking structure of PIM in the prior art.
Figure 2:
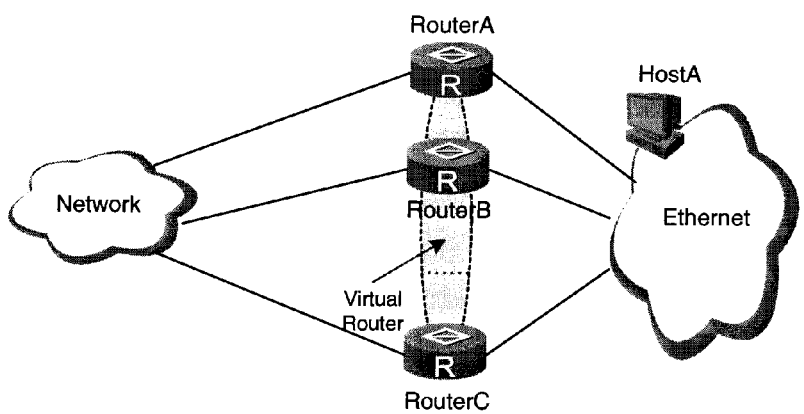
FIG. 2 shows a networking structure of multicast traffic redundancy protection according to some embodiments.
Figure 3:
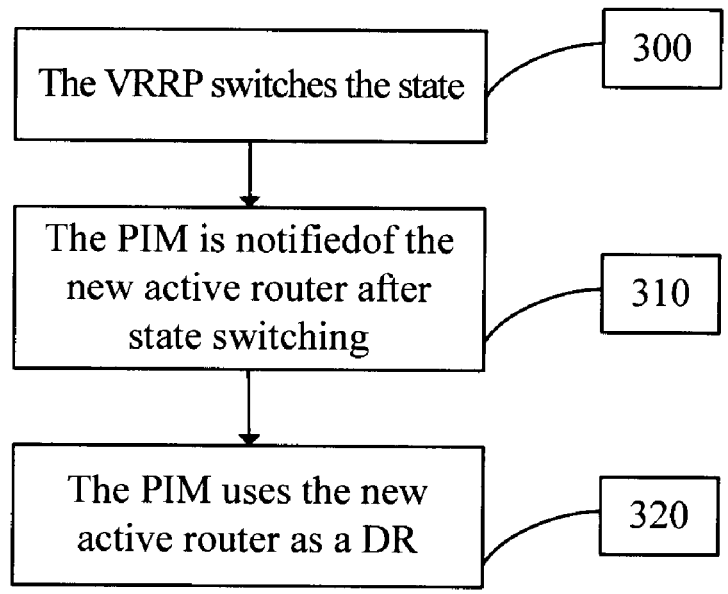
FIG. 3 is a flowchart of a method for multicast traffic redundancy protection according to some embodiments.

FIG. 2 shows a networking structure of multicast traffic redundancy protection according to some embodiments. For example, FIG. 2 shows the networking of the path protection of the VRRP composed of Host A and multicast routers A, B, and C in the LAN network segment shown in FIG. 1. Supposing that router A is active router and responsible for forwarding services, router B and router C are standby routers. For simplicity, an active router in the VRRP network in FIG. 2 serves as an upstream neighbor of the receiving Host A concurrently. In practice, other network devices may also be deployed between the active router and Host A. As shown in FIG. 3, the method includes as follows:

300: After the active router of the VRRP is unable to forward the services normally, the VRRP state switching module switches the state. Specifically, the standby router of the highest priority becomes mew active router automatically, and the original active router becomes standby router; the VRRP organizes a group of routers in the LAN into a standby group, which is functionally equivalent to a virtual router. The hosts in the LAN know only the IP address of the virtual router, and do not know the IP address of a specific device in the standby group. They set the next-hop address of their own default route to the IP address of the virtual router. Therefore, the host in the network communicates with other networks through the virtual router. Specifically, the VRRP determines an active router by comparing the VRRP priority and the IP address, and the services are undertaken by the active router. The active router sends a VRRP advertisement message to other standby routers in the standby group at intervals to notify that the active router is working normally. If a standby router fails to receive the VRRP advertisement message after expiry of the timer, the standby router of the highest priority becomes active automatically. The convergence period of the VRRP is three seconds.

In the case of unicast, only the active router in the standby group is responsible for forwarding the unicast services. However, in the case of multicast, all routers in the standby group may forward the multicast services. This embodiment is specific to the multicast service, and instructs the routers to determine the DR though the Assert messages of the PIM by virtue of the fast switching of the VRRP.

310: The PIM is notified of the new active router after state switching. Specifically, the VRRP state switching module may notify the PIM module in the way of, for example, transmitting parameters, and the notification indicates the new active router after state switching of the VRRP.

320: The PIM uses the new active router in step 310 as its own DR. The DR is responsible for forwarding the multicast packets.

After a new DR is determined through the Assert messages of the PIM, the tree forwarding path of the multicast packet needs to change in the network. Specifically, the nodes need to be pruned or grafted. That is, the original active route is pruned, and the new active router is grafted. Pruning and grafting may be performed using standard techniques, and are therefore not further discussed herein.

The convergence time of the VRRP is three seconds, namely, the switching time is less than three seconds. Consistent with some embodiments, the VRRP in which the state of the router switches fast triggers the PIM to switch quickly, and to use the new active router as a new DR, thus reducing the convergence time of the reselection through the Assert messages of the PIM. The multicast traffic may be switched to the new DR quickly, thus shortening the switching delay of the Assert effectively, avoiding transient interruption of the multicast traffic, and ensuring reliability of the multicast data.

Furthermore, consistent with some embodiments, the active router in the VRRP in a unicast environment is the same as the DR in the PIM in a multicast environment. Therefore, the PIM multicast path is ensured to be the same as the unicast path at the subscriber side.

Furthermore, most network devices in the actual networking environment support the VRRP. Therefore, according to some embodiments, the multicast traffic may be switched to the new DR quickly without changing the existing network devices, thus shortening the switching delay of the Assert effectively and avoiding transient interruption of the multicast traffic.

Before the VRRP switches the state in step 300, detects whether the active router is faulty. Specifically, the VRRP detects the fault by itself, or detects the fault through a special fault detection protocol such as BFD, and then instructs the VRRP to switch the state, as detailed below.

Figure 4:
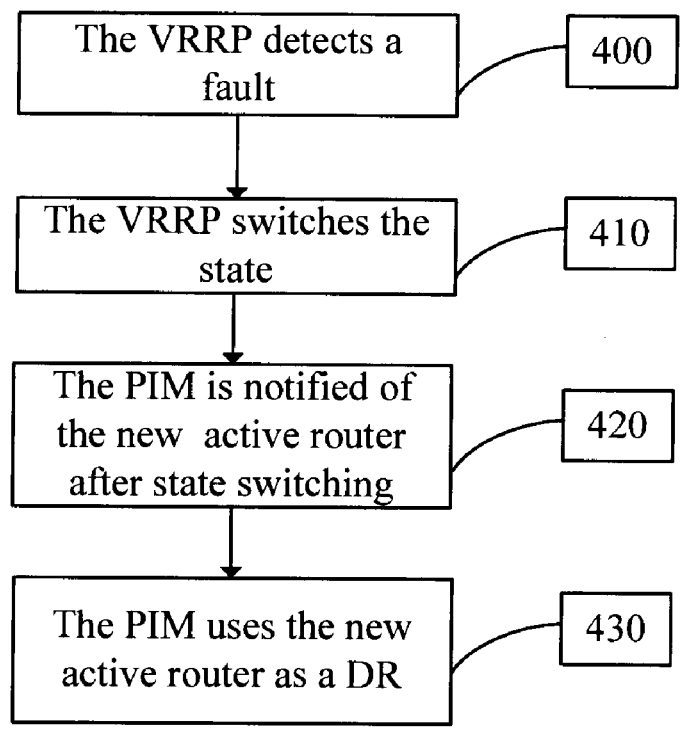
FIG. 4 is a flowchart of another method for multicast traffic redundancy protection according to some embodiments.

FIG. 4 is a flowchart of another method for multicast traffic redundancy protection according to some embodiments. If the VRRP detects a fault by itself before the VRRP switches the state in step 300, as shown in FIG. 4, a step of the VRRP detecting the fault is included before the VRRP switches the state. The fault in the VRRP may be detected using known techniques, including: The active router sends a VRRP advertisement message to other standby routers in the standby group at intervals to notify that the active router is working normally. If a standby router fails to receive the VRRP advertisement message after expiry of the timer, occurrence of a fault is determined.

In some embodiments, the VRRP in which faults are detected fast and the state of the router switches fast triggers the PIM to switch quickly, and use the new active router as a DR, thus reducing the convergence time of the Assert reselection. The multicast traffic may be switched to the new DR quickly, thus shortening the switching delay of the Assert effectively, avoiding transient interruption of the multicast traffic, and ensuring reliability of the multicast data.

Furthermore, consistent with some embodiments, the active router in the VRRP in a unicast environment is the same as the DR in the PIM in a multicast environment. Therefore, the PIM multicast path is ensured to be the same as the unicast path at the subscriber side.

Furthermore, most network devices in the actual networking environment support the VRRP. Therefore, consistent with some embodiments, the multicast traffic may switch to the new DR quickly without changing the existing network devices, thus shortening the switching delay of the Assert effectively and avoiding transient interruption of the multicast traffic.

Figure 5:
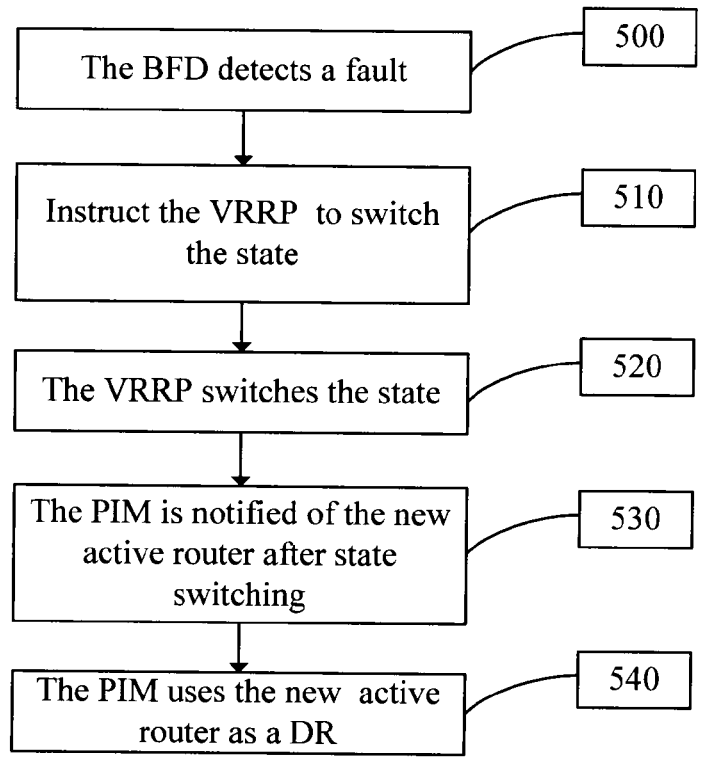
FIG. 5 is a flowchart of another method for multicast traffic redundancy protection according to some embodiments.
Figure 6:
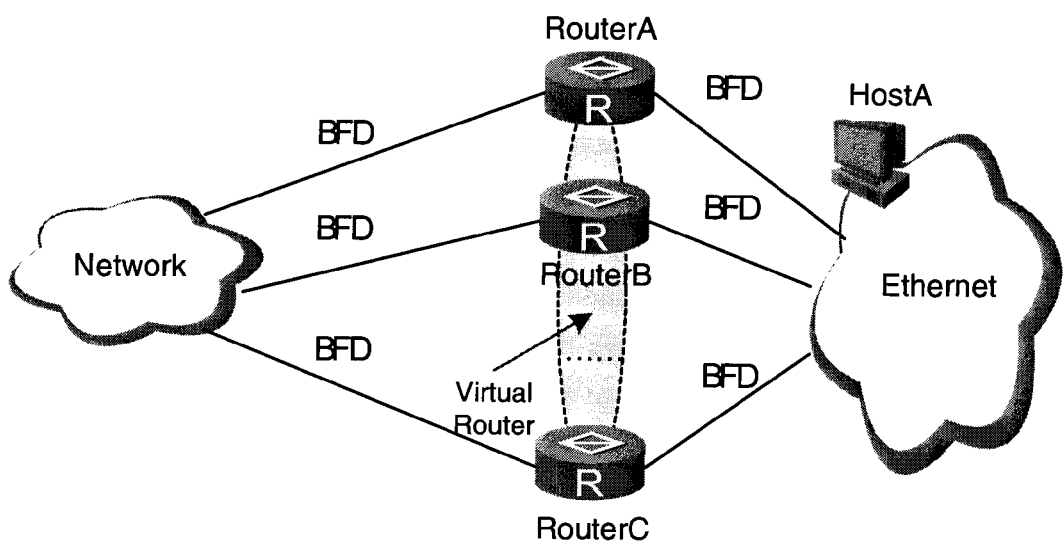
FIG. 6 shows a networking structure of multicast traffic redundancy protection according to some embodiments.

FIG. 6 shows a networking structure of multicast traffic redundancy protection according to some embodiments. In a device whose VRRP fault detection is not timely enough, other fault detection technologies such as BFD may be used as assistance in order to accomplish fast switching of the VRRP router. FIG. 6 shows the networking of the PIM path protection of BFD+VRRP composed of Host A and multicast routers A, B, and C in the LAN network segment shown in FIG. 1. Supposing that router A is active router and responsible for forwarding services, router B and router C are standby. For simplicity, an active router in the VRRP network in FIG. 6 serves as an upstream neighbor of the receiving Host A concurrently. In practice, other network devices may also be deployed between the active router and Host A. Meanwhile, the BFD runs on the network to detect the fault quickly. As shown in FIG. 5, the method includes as follows:

500: The BFD detects a fault. The BFD technology can perform fault detection on any type of channels between the systems. Such channels include direct physical link, virtual circuit, tunnel, MPLS LSP, multi-hop routing channel, and indirect channel. Because the BFD is simple in implementing fault detection, the BFD can be dedicated to fast detection of forwarding faults.

The BFD is adapted to detect communication faults between engines. The BFD detects the connectivity of a data protocol between two systems on the same path. The path may be a physical link or logical link, including tunnels. The BFD may be regarded as a service provided by the system: The upper-layer application provides the parameters such as detection address and detection time to the BFD; the BFD creates, deletes, or modifies the BFD session according to such information, and notifies the upper-layer application of the session state. The upper-layer application decides the measures to be taken for change of the BFD session state.

Specifically, the BFD detection is to create a BFD session between two systems, and send a detection packet periodically along the path between them. If either party fails to receive the BFD control packet within the specified time, it is determined that a fault occurs on the path. The BFD is capable of detecting the link fault of a millisecond magnitude.

510: Instruct the VRRP to switch the state. Specifically, the BFD module may notify the VRRP state switching module in the way of, for example, transmitting parameters, and the notification indicates that the active router is unable to forward multicast services and needs to switch the state.

520: The VRRP switches the state. After receiving the fault notification from the BFD module, the VRRP state switching module switches the state. Specifically, the standby router of the highest priority changes to be new active router automatically, and the original active router changes to be standby router.

530: The PIM is notified of the new active router after state switching. Specifically, the VRRP state switching module may notify the PIM module in the way of, for example, transmitting parameters, and the notification indicates the new active router after state switching of the VRRP.

540: The PIM uses the new active router in step 530 as its own DR. The DR is responsible for forwarding the multicast packets.

After a new DR is determined through the Assert messages of the PIM, the tree forwarding path of the multicast packet needs to change in the network. Specifically, the nodes need to be pruned or grafted. That is, the original active route is pruned, and the new active router is grafted. Because the pruning and grafting are well-known to those skilled in the art and are not linchpins of the embodiments of the present invention, they are not repeated here any further.

With respect to embodiments disclosed in, for example, FIGS. 5 and 6, the BFD is taken as an example. In practice, other special fault detection may be applied, which are based on the same principles and are not repeated here any further.

The BFD may implement link fault detection of the millisecond magnitude. A BFD fast fault detection is applied in this embodiment to trigger the standby router of the highest priority to be new active automatically when the original active router of the VRRP fails. The PIM is triggered to switch quickly, and use the new active router as a new DR, thus switching the multicast traffic to the new DR quickly, reducing the convergence time of the Assert reselection, shortening the switching delay of the Assert effectively, avoiding transient interruption of the multicast traffic, and ensuring reliability of the multicast data.

Furthermore, consistent with some embodiments, the active router in the VRRP in a unicast environment is the same as the DR in the PIM in a multicast environment. Therefore, the PIM multicast path is ensured to be the same as the unicast path at the subscriber side.

Figure 7:
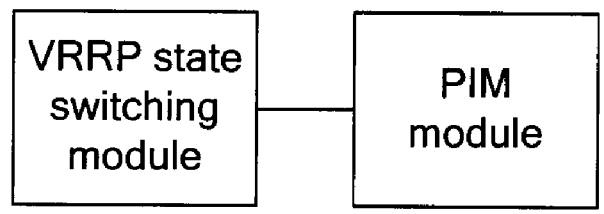
FIG. 7 shows a layer-3 network device of multicast traffic redundancy protection according to some embodiments.

FIG. 7 shows a layer-3 network device of multicast traffic redundancy protection according to some embodiments. As shown in FIG. 7, a layer-3 network device capable of providing multicast traffic redundancy protection is provided. The layer-3 network device includes: a VRRP state switching module, adapted to: switch the state of the VRRP, and notify a PIM module of a new active router in the VRRP mechanism; and the PIM module, adapted to: receive the notification from the VRRP state switching module, and use the new active router as the DR of the PIM module.

Furthermore, the layer-3 device may include a fault detecting module, adapted to detect whether an original active router is faulty. Specifically, the VRRP fault detecting module detects the fault by itself or through a special fault detecting module such as BFD. When the fault is detected, instruct the VRRP state switching module to switch the state, as detailed below.

Figure 8:
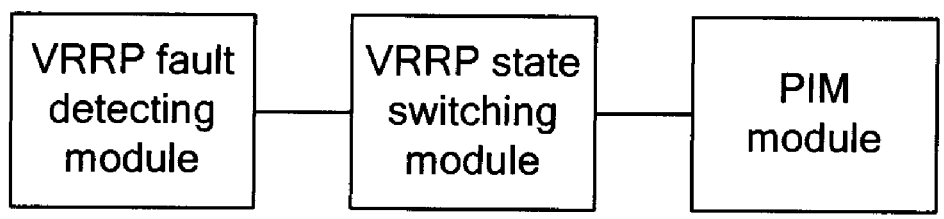
FIG. 8 shows another layer-3 network device of multicast traffic redundancy protection according to some embodiments.

FIG. 8 shows another layer-3 network device of multicast traffic redundancy protection according to some embodiments. As shown in FIG. 8, a layer-3 network device capable of providing multicast traffic redundancy protection is provided. The layer-3 network device includes: a VRRP fault detecting module, adapted to: detect whether an original active router forwards services normally, and instruct a VRRP state switching module to switch the state if the original active router is unable to forward the services normally; the VRRP state switching module, adapted to: switch the state of the VRRP, and notify a PIM module of a new active router in the VRRP; and the PIM module, adapted to: receive the notification from the VRRP state switching module, and use the new active router as the DR of the PIM module.

Figure 9:
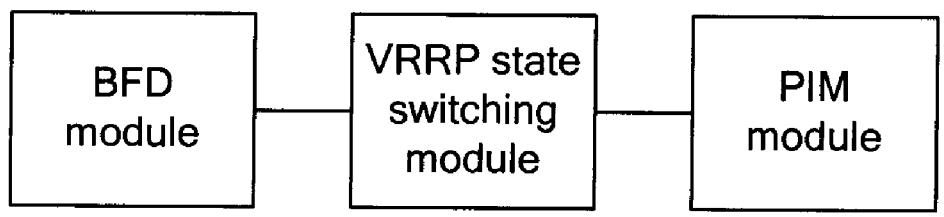
FIG. 9 shows another layer-3 network device of multicast traffic redundancy protection according to some embodiments.

FIG. 9 shows another layer-3 network device of multicast traffic redundancy protection according to some embodiments. As shown in FIG. 9, a layer-3 network device capable of providing multicast traffic redundancy protection is provided. The layer-3 network device includes: a BFD module, adapted to: detect whether an original active router forwards services normally, and instruct a VRRP state switching module to switch the state if the original active router is unable to forward the services normally; the VRRP state switching module, adapted to: switch the state of the VRRP, and notify a PIM module of a new active router in the VRRP; and the PIM module, adapted to: receive the notification from the VRRP state switching module, and use the new active router as the DR of the PIM module.

The layer-3 network device illustrated in FIGS. 7-9 may be a router or a layer-3 switch, namely, a network device capable of identifying the layer-3 information stipulated in the TCP/IP, for example, IP address information.

According to some embodiments, the PIM is triggered to switch quickly for the VRRP/BFD fast fault detection and the VRRP fast switching, and use the new active router as a new DR, thus reducing the convergence time of the Assert reselection. The multicast traffic may be switched to the new DR quickly, thus shortening the switching delay of the Assert effectively, avoiding transient interruption of the multicast traffic, and ensuring reliability of the multicast data.

Furthermore, consistent with some embodiments, the active router in the VRRP in a unicast environment is the same as the DR in the PIM in a multicast environment. Therefore, the PIM multicast path is ensured to be the same as the unicast path at the subscriber side.

Furthermore, most network devices in the actual networking environment support the VRRP. Therefore, consistent with some embodiments, the multicast traffic may be switched to the new DR quickly without changing the existing network devices, thus shortening the switching delay of the Assert effectively and avoiding transient interruption of the multicast traffic.

Some embodiments may be apparent to those skilled in the art from consideration of the specification and practice of the embodiments disclosed herein. It is intended that the specification and examples be considered as exemplary only, with a true scope and spirit of the embodiments disclosed herein being indicated by the following claims.

What is claimed is:

1. A method of multicast traffic redundancy protection, comprising: detecting an original active router; switching a Virtual Route Redundancy Protocol (VRRP) state, by a Virtual Route Redundancy Protocol (VRRP) state switching module if the original active router is faulty, and selecting a new active router; notifying, by the VRRP state switching module, a Protocol Independent Multicast (PIM) routing protocol module of the new active router after the VRRP state switching; and selecting, by the PIM module, the new active router in the VRRP as a Designated Router (DR) in the PIM; wherein the process of notifying the PIM module of the new active router after the state switching and selecting the new active router as the DR by the PIM module comprises: notifying, by the VRRP state switching module through a parameter transmission, the PIM module of the new active router after the VRRP state switching; and selecting, by the PIM module through an Assert message, the new active router as the DR.

2. The method of claim 1, wherein the process of detecting the original active router comprises:
   detecting whether the original active router is faulty through the VRRP or special fault detection protocols, wherein the special fault detection protocols comprise a Bidirectional Forwarding Detection (BFD) protocol.

3. The method of claim 1, wherein the process of switching the state by the VRRP state switching module and selecting the new active router comprises:
   switching a standby router of highest priority to be the new active router automatically, and switching the original active router to be a standby router.

4. The method of claim 1, further comprising: pruning, by the PIM module, the original active router after selecting the new active router as the DR, and grafting the new active router.

5. A layer-3 network device, comprising: a fault detecting module, adapted to detect whether an original active router is faulty; a Virtual Route Redundancy Protocol (VRRP) state switching module, adapted to select a new active router and notify a Protocol Independent Multicast (PIM) routing protocol module of the new active router in the VRRP; and the PIM module, adapted to select the new active router in the VRRP as a Designated Router (DR) in the PIM, wherein: when detecting that the original active router is faulty, the fault detecting module instructs the VRRP state switching module to switch a state and select the new active router; wherein the VRRP state switching module is further adapted to notify the PIM module of the new active router through a parameter transmission after the VRRP state switching; and the PIM module is further adapted to select the new active router as the DR through an Assert message.

6. The device of claim 5, wherein the fault detecting module comprises a VRRP fault detecting module.

7. The device of claim 5, wherein the fault detecting module comprises a special fault detecting module.

8. The device of claim 7, wherein the special fault detecting module comprises a Bidirectional Forwarding Detecting (BFD) module.

* * * * *